May 31, 1932.  E. B. ROYLE  1,861,286
AUTOMOBILE VENTILATOR
Filed Feb. 15, 1930
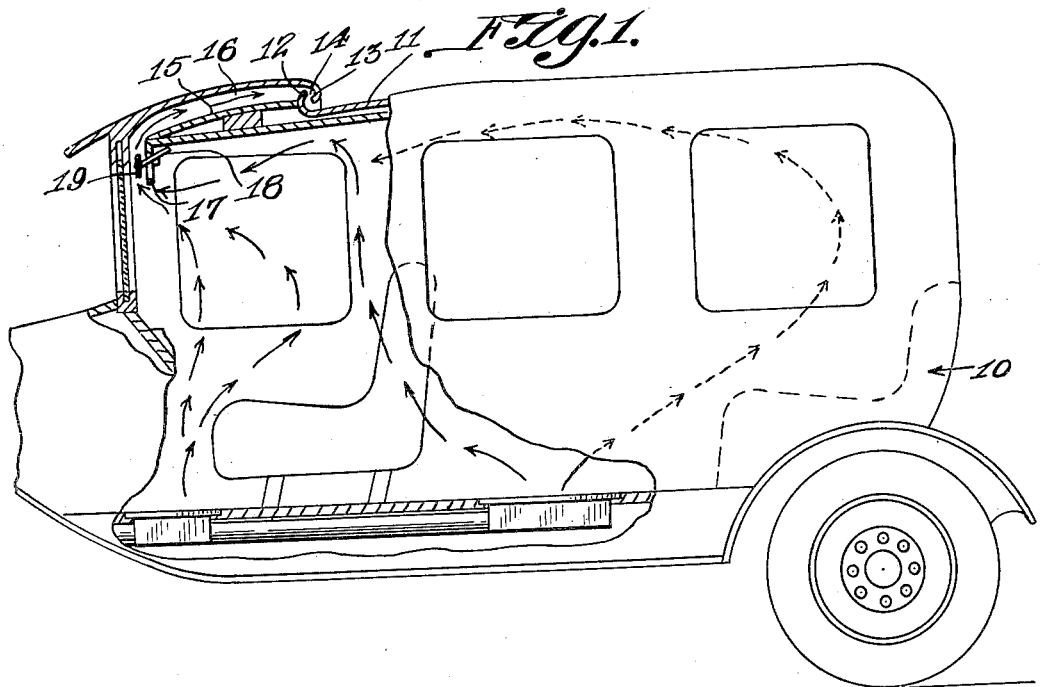
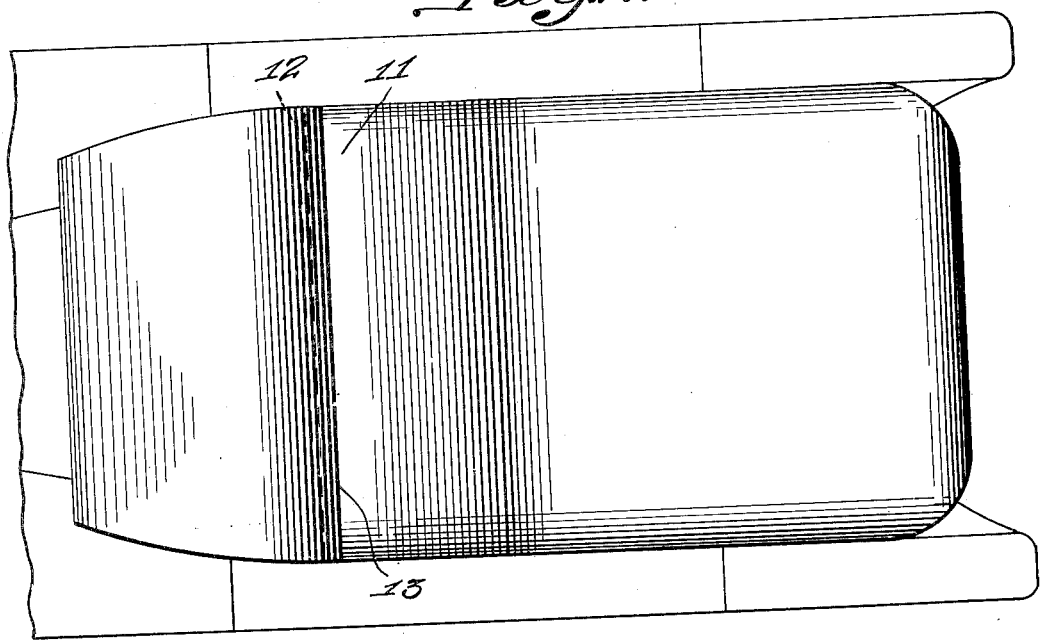
E. Burton Royle, INVENTOR
BY Victor J. Evans
ATTORNEY
WITNESS:

Patented May 31, 1932

1,861,286

UNITED STATES PATENT OFFICE

EDWIN BURTON ROYLE, OF EUREKA, UTAH

AUTOMOBILE VENTILATOR

Application filed February 15, 1930. Serial No. 428,767.

This invention relates to certain new and useful improvements in ventilators of a type designed for special application upon motor vehicles and the like.

One of the principal objects of the invention contemplates the provision and arrangement of a form of duct to be suitably arranged within the top of the vehicle.

Another object of the invention consists of baffles for the duct to prevent ingress of rain, wind and the like into the interior of the vehicle.

An additional object of the invention embodies a form of valve or damper for the duct whereby the latter may be cut off at will from the interior of the vehicle.

With the above and other objects in view, the invention further consists of the following novel features and details of construction, to be hereinafter more fully described, illustrated in the accompanying drawings and pointed out in the appended claim.

In the drawings:—

Figure 1 is a fragmentary side elevation of a motor vehicle with appropriate portions of the body construction thereof partially broken away to illustrate the construction of the invention and its relative arrangement with respect to the conventional vehicle body construction.

Figure 2 is a top plan view of the arrangement disclosed in Figure 1.

Referring to the drawings in detail wherein like characters of reference denote corresponding parts, the reference character 10 indicates generally the body of a vehicle of the conventional form and which may be provided with a windshield construction of any desired type, that is, the vertically sliding or laterally swinging; the former type, however is being given special consideration for purposes of illustration only to bring about a clear understanding of the operation of the present invention.

The invention necessitates alteration of the outermost covering of the vehicle top to an extent which will necessitate the inclining of an appreciable portion thereof toward the front, such as indicated at 11. The foremost edge of such portion which is downwardly and forwardly inclined is curved upwardly and rearwardly upon itself to provide a channel member or portion 12 having communication at its ends with the customary forms of rain gutters or the like arranged upon opposite sides of the vehicle and bordering the top construction thereof whereby rain, melted snow and the like may be directed laterally of the vehicle top toward the aforementioned gutters.

The forward portion of the vehicle top disposed throughout the major portion of its length at a level slightly higher than the inclined portion 11 terminates to provide a downwardly and forwardly curved channel member 13 upon the innermost edge thereof, oppositely disposed with relation to that of the channel member 12 whereby the extreme edges of each of the channel members will be disposed in juxtaposition to the median line of each other whereby the air duct 14 defined therebetween will be a deviated one for purposes to be better understood in the following description of the invention. The foremost section of the vehicle top is provided with a sub-base 15 spaced throughout the entire length thereof from the inner surface of the foremost top section to provide a passage 16 in communication with the duct 14. The rearmost projecting edge of the sub-top base 15 is brought into abutting engagement with the immediate rounded surface of the channel member 12 to prevent the circulation of air beneath the under surface of the rearmost vehicle body top section.

As best illustrated in Figure 1 of the drawings the sub-base 15 is so disposed as to facilitate the establishing of communication between the interior of the vehicle and the passage 16. The conventional form of head board, indicated as at 17, and forming standard equipment upon a class of automobiles for the supporting of the elevating mechanism for the vertically rising type of windshield construction, also serves the added purpose of a support for an operating lever 18 to control the position of a damper or valve 19 within the passage 16 whereby the duct 14 may be shut off and on.

In the Figure 1 illustration, forms of heaters are shown as well as the manner of ridding the car of the heated air through the passage 16 and duct 14. It is to be understood that the invention is not restricted solely for the purpose of taking off the heated air, carbon monoxide and gaseous fumes but may be also utilized to advantage at times when the heaters are not in use, to cool off the occupants of the vehicle by slightly raising the windshield to permit air to circulate therebeneath and travel upwardly against the inner surface of the windshield into the passage 16 thereby creating suction sufficient to induce the hot air collecting adjacent the top to pass out through the duct 14. It is to be noted that the pocket formed by the inclined portion 11 of the top adjacent the channel members 12 and 13 respectively will also cause suction to take place and coact with the first mentioned interior suction action whereby the interior of the vehicle body will be maintained at a degree of temperature to afford the utmost comfort to the occupants thereof.

By reason of the particular location of the duct opening and running the full width of the vehicle top, it will be noted that all vapor and condensation within the vehicle will be drawn out thereby preventing the accumulating and freezing of moisture upon the windows and windshield, one of the chief hazards of winter driving.

The invention is susceptible of various changes in its form, proportions and minor details of construction, and the right is herein reserved to make such changes as properly fall within the scope of the appended claim.

Having described the invention, what is claimed is:—

A ventilator construction for motor vehicles and within the tops thereof comprising multiple top sections located at different levels, the adjacent ends of the top sections being oppositely curved to provide channel members having the extreme edges of the channel members disposed in juxtaposition to the median line of each other to define a devious air duct, a sub-base having communication wth the curve of the adjacent channel member and spaced at its opposite end from the uppermost of the top sections to define a passage having communication at its ends with said air duct and the interior of the vehicle, and a damper disposed within the vehicle for controlling the ingress and egress of air through the innermost end of said passage.

In testimony whereof I affix my signature.

EDWIN BURTON ROYLE.